(12) United States Patent
Zhang et al.

(10) Patent No.: US 7,715,185 B2
(45) Date of Patent: May 11, 2010

(54) MOUNTING APPARATUS FOR DATA STORAGE DEVICE

(75) Inventors: Guang-Yi Zhang, Shenzhen (CN); Xiao-Zheng Li, Shenzhen (CN); Zhe Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/255,641

(22) Filed: Oct. 21, 2008

(65) Prior Publication Data
US 2009/0213535 A1 Aug. 27, 2009

(30) Foreign Application Priority Data
Feb. 21, 2008 (CN) .................... 2008 1 0300376

(51) Int. Cl.
*G06F 1/16* (2006.01)
(52) U.S. Cl. .................... 361/679.37; 361/679.33
(58) Field of Classification Search .................... 361/679.33–679.39
See application file for complete search history.

(56) References Cited

U.S. PATENT DOCUMENTS

| | | | | |
|---|---|---|---|---|
| 5,557,499 A | * | 9/1996 | Reiter et al. | 361/679.39 |
| 6,317,334 B1 | * | 11/2001 | Abruzzini et al. | 361/679.33 |
| 6,381,130 B1 | * | 4/2002 | Yen | 361/679.33 |
| 6,560,098 B1 | * | 5/2003 | Beinor et al. | 361/679.39 |
| 6,606,256 B1 | * | 8/2003 | Lee et al. | 361/679.33 |
| 6,612,667 B2 | * | 9/2003 | Tsai et al. | 361/679.34 |
| 6,637,719 B2 | * | 10/2003 | Jiang | 361/679.33 |
| 6,819,555 B2 | * | 11/2004 | Bolognia et al. | 361/679.33 |
| 6,970,350 B2 | * | 11/2005 | Schmid et al. | 361/679.33 |
| 7,254,017 B2 | * | 8/2007 | Peng et al. | 361/679.33 |
| 7,280,352 B2 | * | 10/2007 | Wilson et al. | 361/679.33 |
| 7,511,952 B2 | * | 3/2009 | Chen et al. | 361/679.33 |
| 7,511,953 B2 | * | 3/2009 | Tao et al. | 361/679.39 |
| 7,523,901 B2 | * | 4/2009 | Wu et al. | 361/685 |
| 7,639,490 B2 | * | 12/2009 | Qin et al. | 361/679.34 |
| 2003/0099094 A1 | * | 5/2003 | Coles et al. | 361/685 |
| 2004/0100763 A1 | * | 5/2004 | Yuan et al. | 361/685 |
| 2004/0190266 A1 | * | 9/2004 | Chung | 361/685 |
| 2005/0007732 A1 | * | 1/2005 | Hsu | 361/685 |
| 2005/0128699 A1 | * | 6/2005 | Peng et al. | 361/686 |
| 2006/0232923 A1 | * | 10/2006 | Liang | 361/685 |

* cited by examiner

*Primary Examiner*—Lisa Lea-Edmonds
(74) *Attorney, Agent, or Firm*—Zhigang Ma (57) ABSTRACT

A mounting apparatus for a data storage device that includes a tab includes a bracket, a locking member, and an operating assembly. The bracket includes a bezel defining an opening and a first cutout corresponding to the tab. The locking member, movable on the bezel, defines a second cutout corresponding to the first cutout. The operating assembly is assembled in the bezel and slides the locking member on the bezel to align or misalign the second cutout with the first cutout.

8 Claims, 9 Drawing Sheets

MOUNTING APPARATUS FOR DATA STORAGE DEVICE

BACKGROUND

1. Field of the Invention

The present invention relates to hardware mounting and, specifically, to a mounting apparatus readily allowing secure installation or removal of a data storage device to or from a permanent structure.

2. Description of Related Art

As computers have proliferated and improved, more and more disk drives are needed. Various devices have been developed to facilitate installation and removal of disk drives. One such device includes a bracket defining two rails on opposite sides, and two side pieces attached to opposite sides, of the disk drive. The disk drive is received in the bracket, with the side pieces being received in the corresponding rails. At least one screw is applied to each side of the bracket and the corresponding side piece when installing the data storage device. However, attachment by screws is complicated and time-consuming. Furthermore, attachment by such means requires extra work space be made available inside the computer enclosure. This requirement compromises current industry trends toward smaller and lighter device profiles.

DETAILED DESCRIPTION

Figure 1:
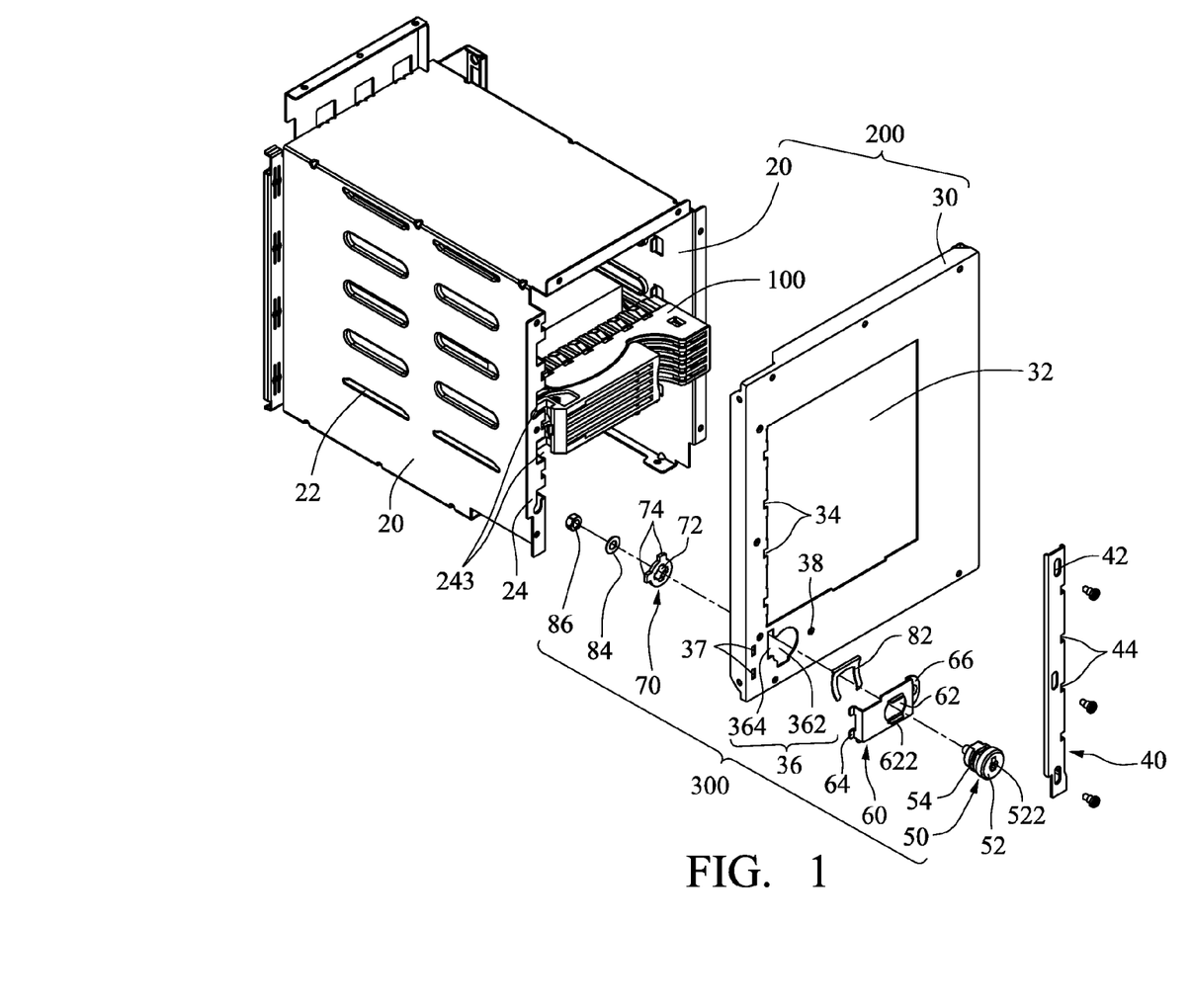
FIG. 1 is an exploded, isometric view of an embodiment of a mounting apparatus applied on a data storage device, the mounting apparatus including a bezel, a locking member, and an operating assembly.

In FIG. 1, a mounting apparatus in accordance with an embodiment seats a data storage device 100. The mounting apparatus includes a bracket 200, a locking member 40 mounted on the bracket 200, and an operating assembly 300.

Figure 2:
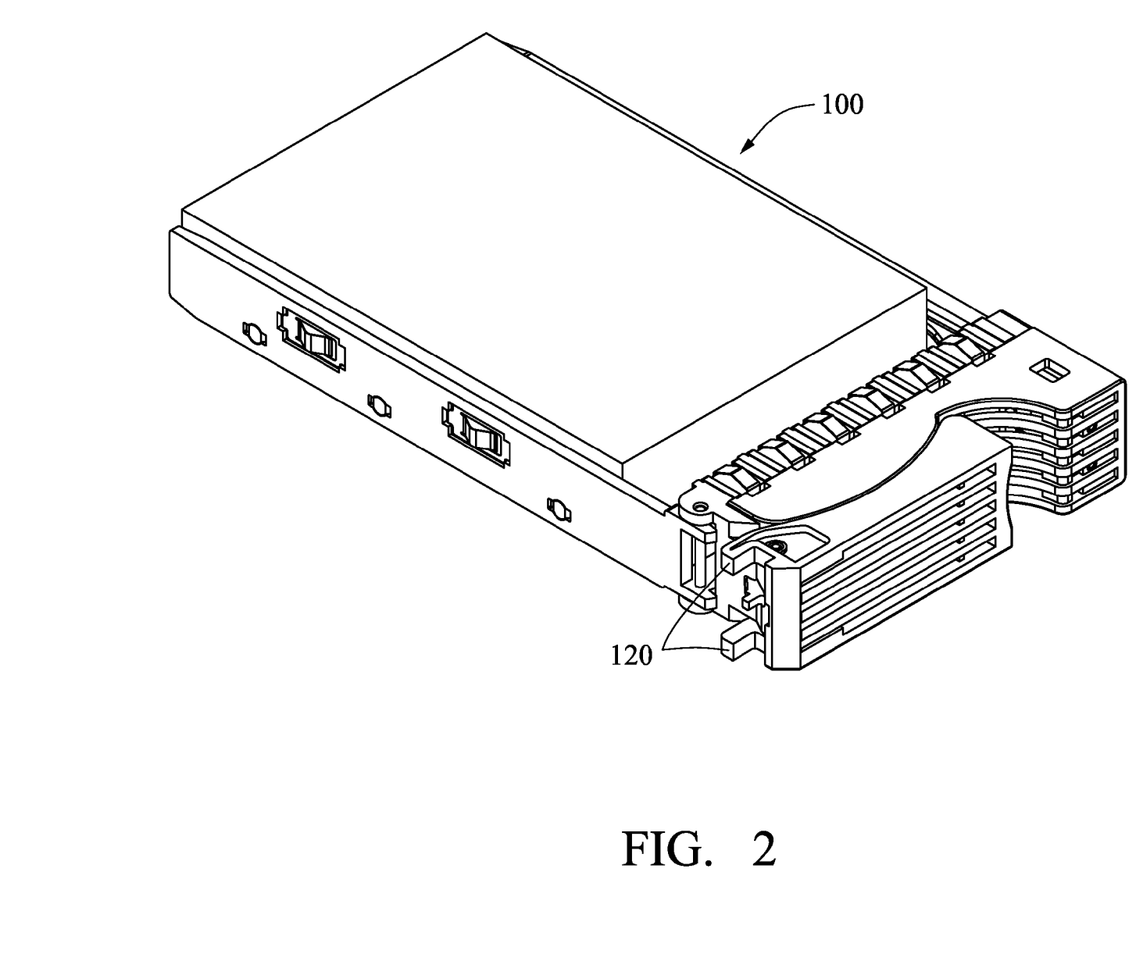
FIG. 2 is an enlarged, isometric view of the data storage device of FIG. 1.

Referring to FIG. 2, the data storage device 100 includes two tabs 120 extending from a side of a front portion of the data storage device 100.

The bracket 200 includes two parallel side plates 20 and a bezel 30.

Two rows of support pieces 22 perpendicularly extend inwardly from the side plates 20, supporting opposite sides of the data storage device 100. Two flanges 24 extend perpendicularly in opposite directions from front ends of the side plates 20. The flanges 24 define a plurality of mounting holes. One of the flanges 24 defines two cutouts 243 corresponding to the tabs 120 of the data storage device 100.

Figure 3:
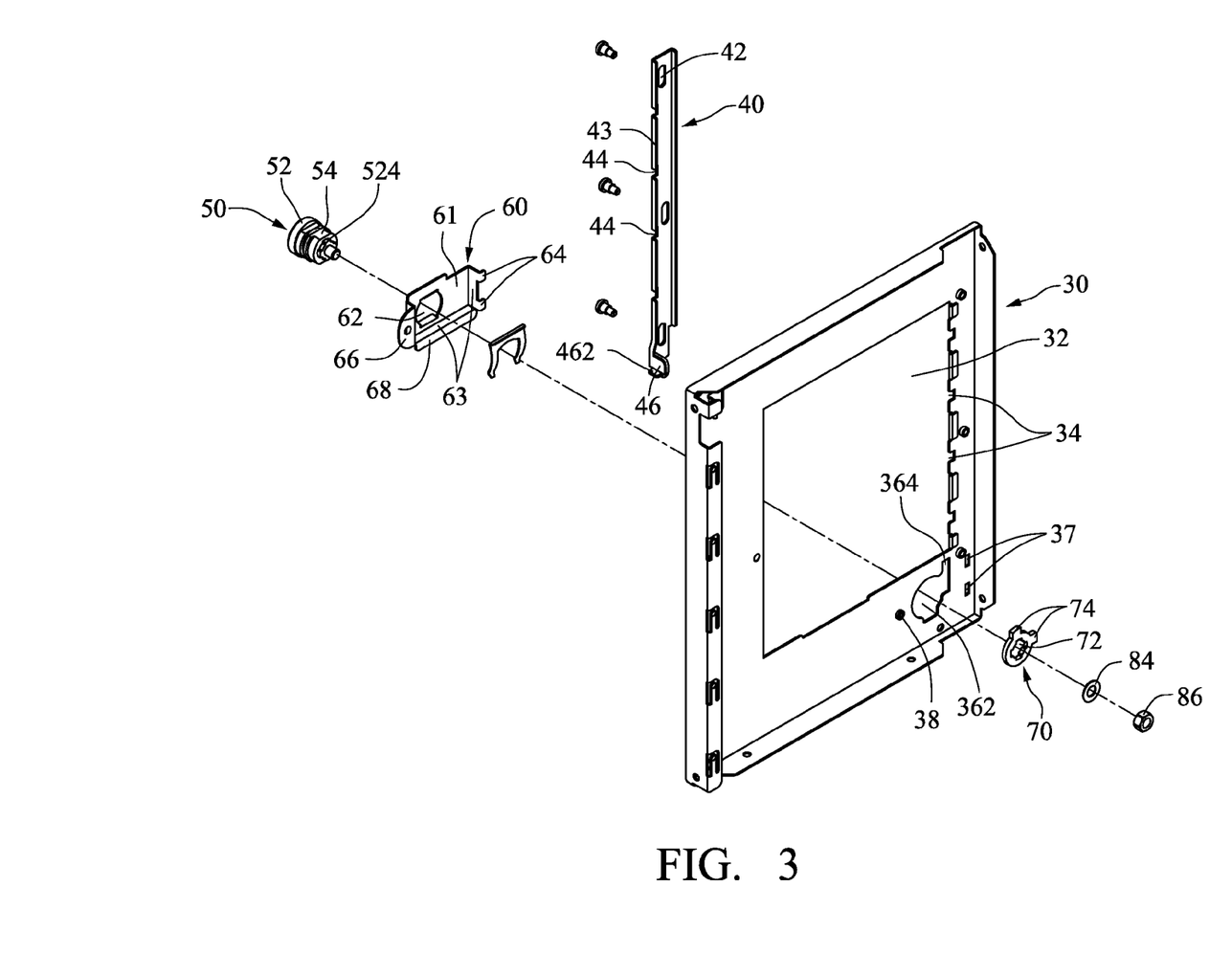
FIG. 3 is an exploded, isometric view of the bezel, the locking member, and the operating assembly of FIG. 1, viewed from another perspective.

Referring to FIG. 3, the bezel 30 defines an opening 32, through which the data storage device 100 passes. A plurality of through holes corresponding to the mounting holes of the flanges 24 of the side plates 20 are defined in the bezel 30 around the opening 32. The bezel 30 defines two cutouts 34 on a side of and communicating with the opening 32, corresponding to the cutouts 243 of the side plate 20. The bezel 30 defines a through hole 36 below a side of the opening 32. The through hole 36 includes a round part 362 and a square part 364 communicating with the round part 362. The bezel 30 defines two slots 37 on one side adjacent to the through hole 36, and a mounting hole 38 at the opposite side.

The locking member 40 is longitudinal and defines a plurality of oval apertures 42 along its axis. Two flanges 43 extend perpendicularly from opposite sides of the locking member 40. Two cutouts 44 are defined in one of the flanges 43. A sliding portion 46 extends from a lower portion of the flange 43 defining the cutouts 44. A fin 462 extends perpendicularly from a bottom of the sliding portion 46.

The operating assembly 300 includes a lock 50, a cover 60, a tab washer 70, an n-shaped fragment 82, a washer 84, and a nut 86.

The lock 50 includes a screw 52 and a hexagon-shaped nut 54. The screw 52 includes a head and a shaft extending from the head. The nut 54 is firmly fitted about the shaft. A keyhole 522 is defined in the head of the screw 52, and a crisscross-shaped projection 524 protrudes from the shaft, opposite to the head.

The cover 60 includes a body 61, and three sidewalls 63 extending from two opposite lateral sides and a bottom side of the body 61. A through hole 62 is defined in the body 61. Two parallel flanges 622 extend from the body 61 at a top side and a bottom side of the through hole 62. Two hooks 64 extend from one of the sidewalls 63 extending from a corresponding lateral side of the body 61, and a tab 66 perpendicularly extends from another sidewall 63 extending from the opposite lateral side of the body 61, opposite to the hooks 64. The tab 66 defines a mounting hole. A bent plate 68 perpendicularly extends down from the sidewall 63 extending from the bottom side of the body 61 (shown in FIG. 3).

Tab washer 70 defines a cross-shaped through hole 72 corresponding to the projection 524 of the screw 52 of the lock 50. Two projections 74 protrude from a circumference of the tab washer 70, perpendicular to each other.

Figure 4:
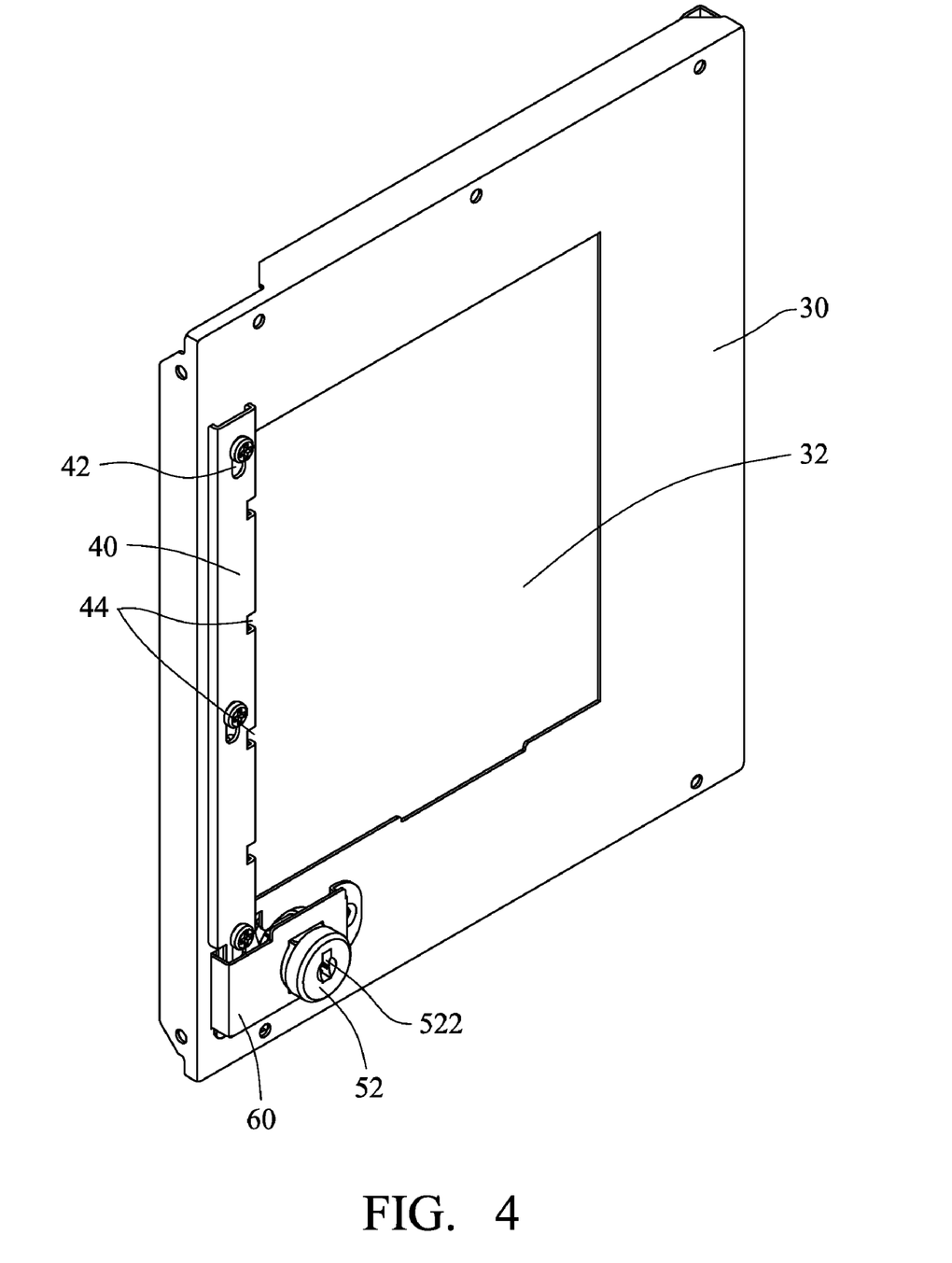
FIG. 4 is an assembled, isometric view of the bezel, the locking member, and the operating assembly of FIG. 1.
Figure 5:
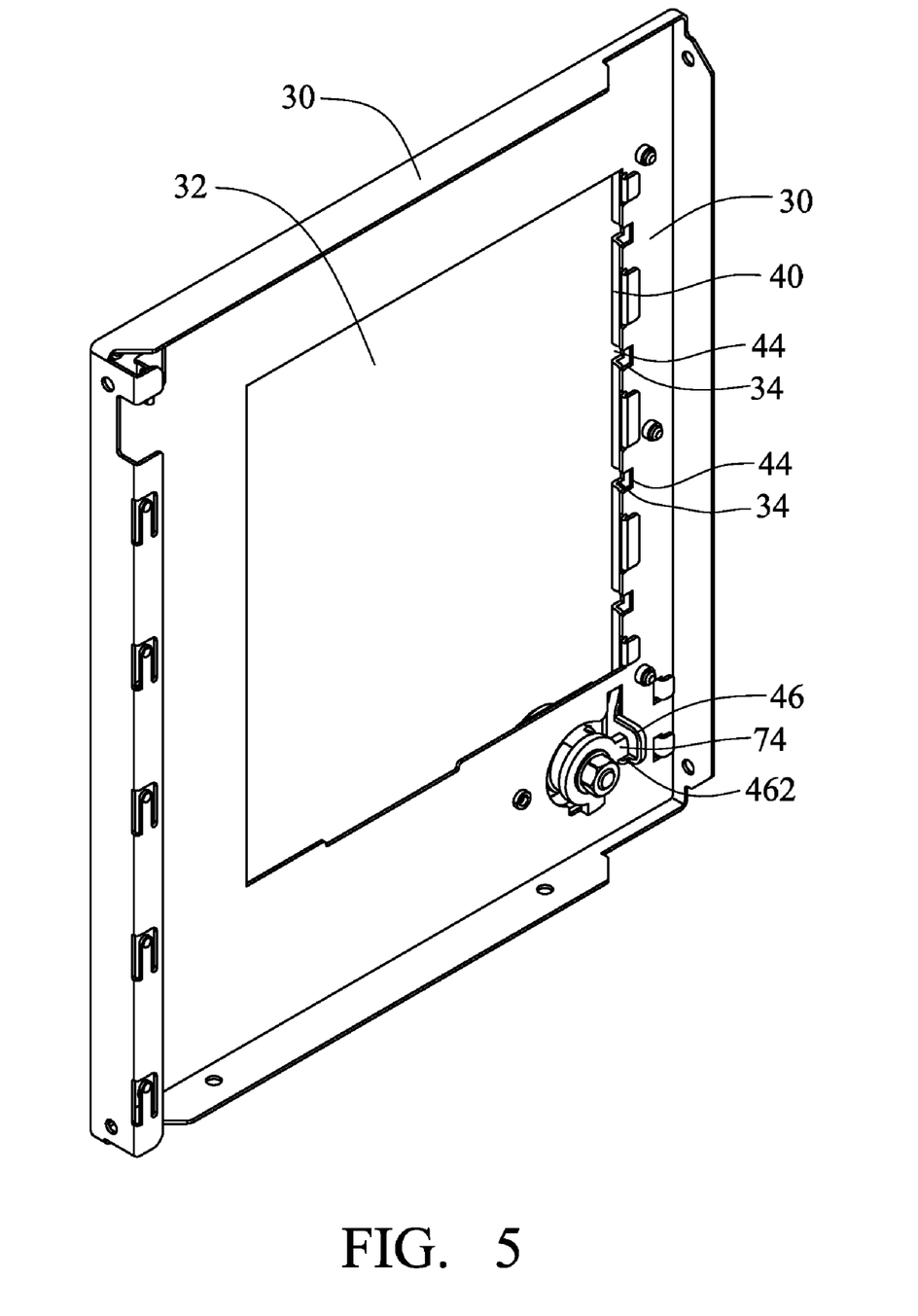
FIG. 5 is an assembled, isometric view of FIG. 3, showing the locking member in a closed position.
Figure 6:
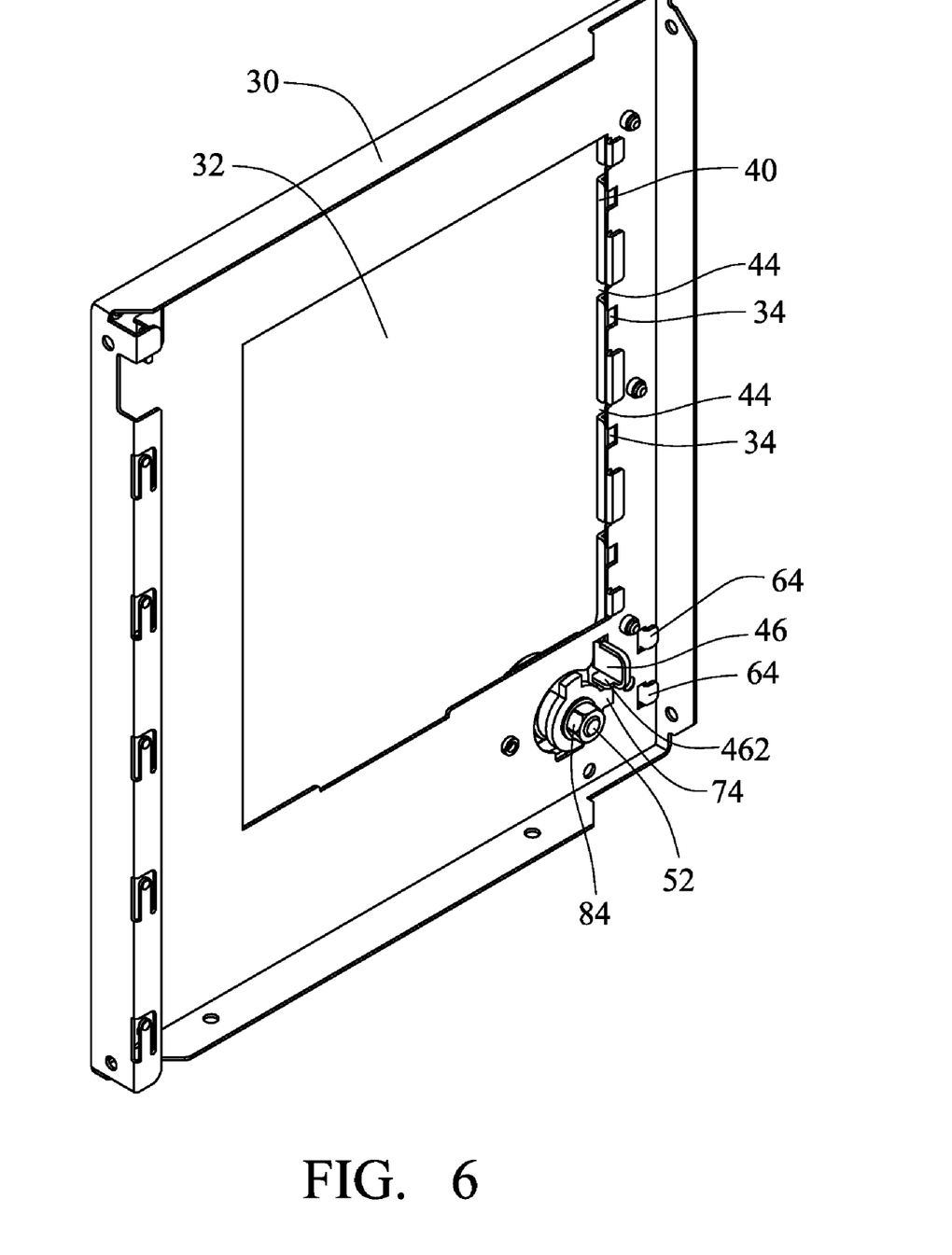
FIG. 6 is an assembled, isometric view similar to FIG. 5, but with the locking member in an open position.

Referring to FIGS. 4 through 6, in assembly, the locking member 40 is attached to the bezel 30, opposite to the side plates 20. The sliding portion 46 is received in the square part 364 of the through hole 36 of the bezel 30. The fin 462 extends to a rear side of the bezel 30 through the round part 362. The cover 60 is attached to the bezel 30 and the locking member 40. The hooks 64 engage the slots 37 of the bezel 30, and the tab 66 is fixed to the bezel 30 via a screw through the mounting hole of the cover 60 to be engaged in the mounting hole 38 of the bezel 30. The bent plate 68 of the cover 60 resists the bezel 30. The shaft of the screw 52 of the lock 50 passes through the through hole 62 of the cover 60, with the nut 54 engaging the flanges 622 of the cover 60. The fragment 82 fits about the nut 54 of the lock 50, attached between the bezel 30 and the cover 60. The shaft of the screw 52 of the lock 50 further passes through the round part 362 of the through hole 36 of the bezel 30. The tab washer 70 fits about the projection 524 of the screw 52 of the lock 50. The fin 462 of the locking member 40 is located between the projections 74 of the tab washer 70. The washer 84 fits about the shaft of the screw 52 and abuts the tab washer 70, opposite to the bezel 30. The nut 86 engages a distal end of the shaft of the screw 52. The bezel 30 is fixed to the flanges 24 of the side plates 20 via screws pass through the apertures 42 of the locking member 40, the mounting holes of the bezel 30 and the mounting holes of the flange 24. The locking member 40 can move relative to the bezel 30.

Figure 7:
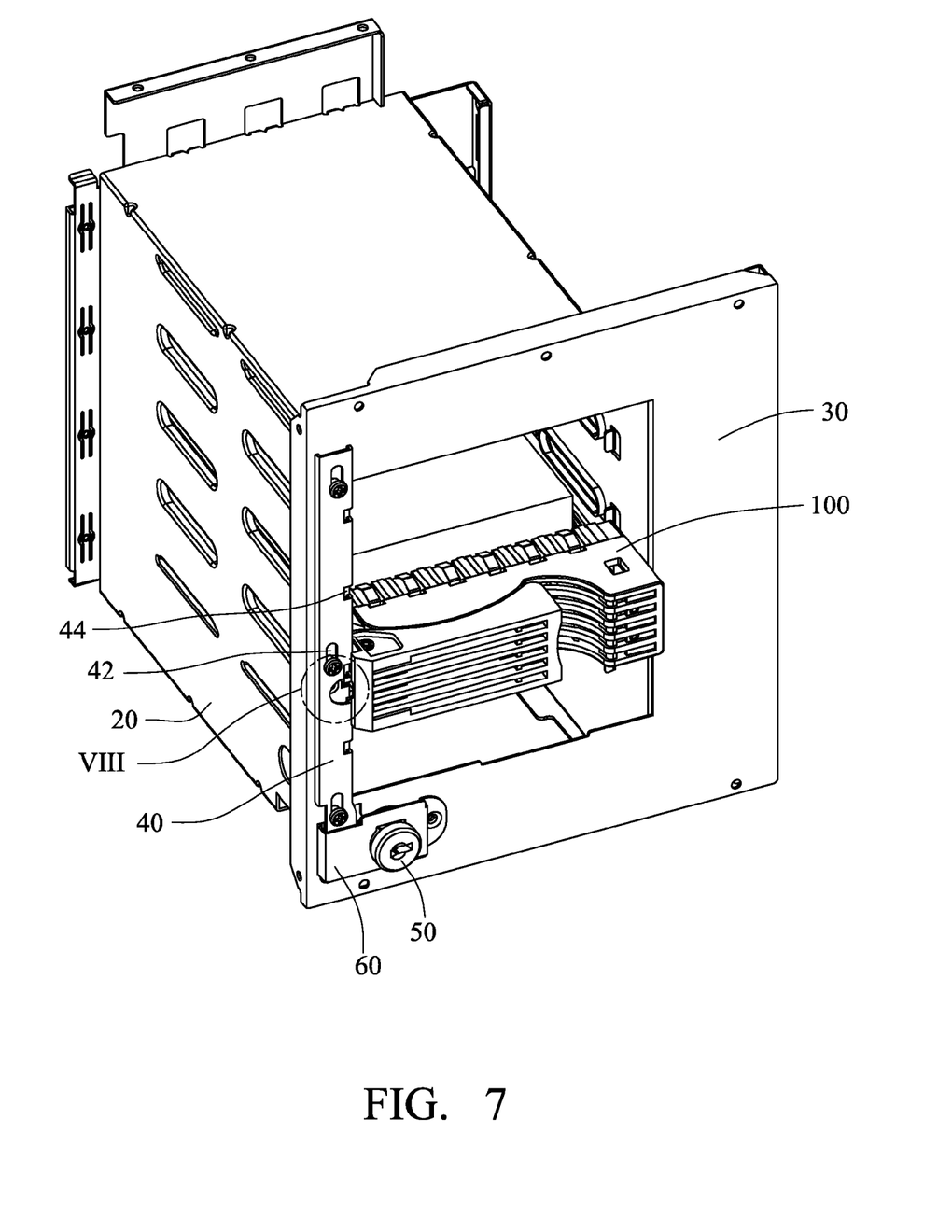
FIG. 7 is an assembled, isometric view of FIG. 1.
Figure 8:
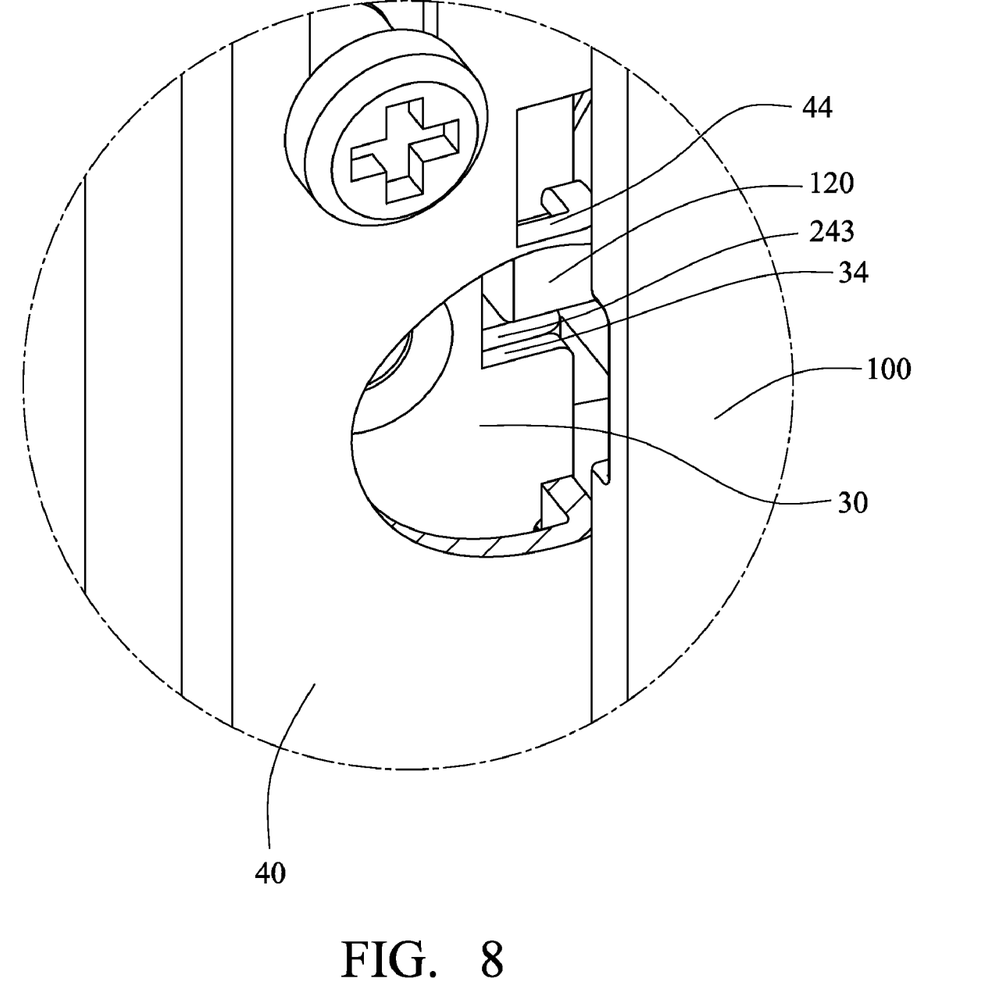
FIG. 8 is an enlarged view of the circled portion VIII of FIG. 7.

Referring to FIGS. 6 through 8, for installation, a key inserted into the keyhole 522 of the lock 50 of the operating assembly 300 rotates the shaft of the screw 52. One of the projections 74 of the tab washer 70 moves the fin 462 of the locking member 40 upward, driving the locking member 40 up the bezel 30, until the cutouts 44 of the locking member 40 misalign with the cutouts 243 of side plates 20, the cutouts 34 of the bezel 30, and the tabs 120 of the data storage device 100. Thus, the data storage device 100 is fixed in the mounting bracket.

Figure 9:
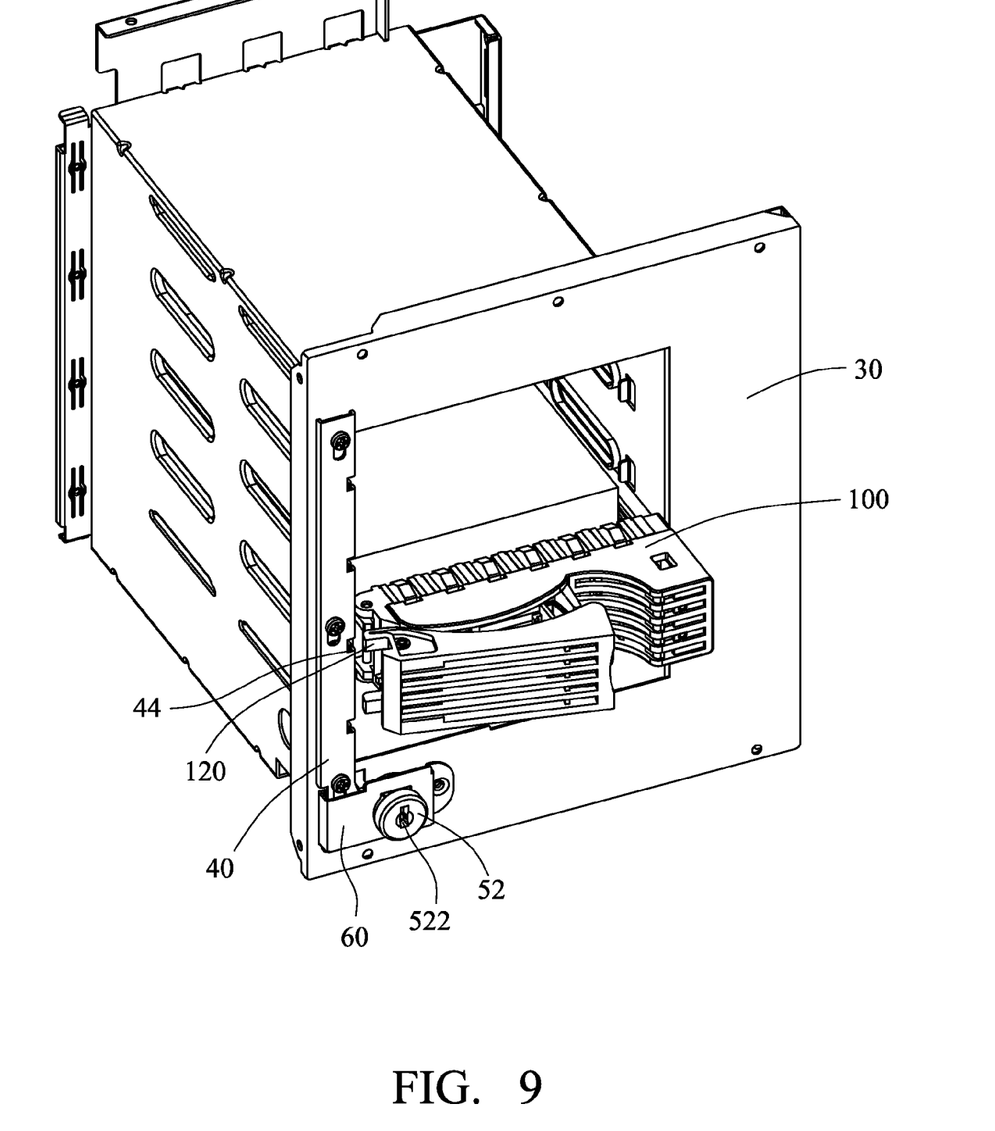
FIG. 9 is an assembled, isometric view similar to FIG. 7, but with the data storage device unlocked.

Referring to FIGS. 4, 5 and 9, for removal, the key inserted into the keyhole 522 of the lock 50 of the operating assembly 300 rotates the shaft of the screw 52, with the other projection 74 of the tab washer 70 pushing the fin 462 of the locking member 40 downward. The locking member 40 is moved down on the bezel 30. When the cutouts 44 of the locking member 40 align with the cutouts 243 of side plates 20, the cutouts 34 of the bezel 30, and the tabs 120 of the data storage device 100, the data storage device 100 can move out of the bracket 200 through the opening 32.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A mounting apparatus for a data storage device, the data storage device comprising at least one tab extending therefrom, the mounting apparatus comprising:
   a bracket comprising a bezel defining an opening and at least one first cutout communicating with the opening, corresponding to the at least one tab of the data storage device;
   a locking member movably assembled to the bezel, the locking member defining at least one second cutout, corresponding to the at least one first cutout and the at least one tab; and
   an operating assembly mounted on the bezel and capable of sliding the locking member on the bezel to align or misalign the at least one second cutout with the at least one first cutout.

2. The mounting apparatus of claim 1, wherein the locking member comprises a sliding portion extending from a lower portion of the locking member, and the operating assembly comprises a rotatable tab washer that comprises two projections protruding from a circumference thereof, wherein one of the projections is capable of moving the locking member upward to misalign the at least one second cutout with the at least one first cutout, and the other projection is capable of moving the locking member down to align the at least one second cutout with the at least one first cutout, allowing the at least one tab to disengage from the bracket.

3. The mounting apparatus of claim 2, wherein the bezel defines a first through hole below the opening, first through hole having a round part, the operating assembly further comprising a cover having a second through hole corresponds to the first through hole, and a lock having a screw passing through the second through hole and the round part of the first through hole, about which the tab washer fits.

4. The mounting apparatus of claim 3, wherein the screw comprises a head defining a keyhole, a shaft protruding from the head, and a projection protruding from the shaft; and wherein the tab washer defines a third through hole capable of receiving the projection.

5. The mounting apparatus of claim 4, wherein the operating assembly further comprises a washer fitting about the shaft and abutting the tab washer, and a nut engaging a distal end of the shaft.

6. The mounting apparatus of claim 3, wherein the first through hole further comprises a square part, the locking member further comprises a sliding portion extends from a lower part of the flange of the locking member, and a fin extends perpendicularly from a bottom of the sliding portion.

7. The mounting apparatus of claim 3, wherein the locking member further defines a plurality of oval apertures along its axis, the bezel defines a plurality of holes, the bracket further comprises two parallel side plates perpendicular to the bezel, and one of the side plates comprises a flange extending perpendicularly from a front side and defining a plurality of mounting holes, and a plurality of mounting members passes through the plurality of oval-shaped apertures and the plurality of holes of the bezel to engage the plurality of mounting holes.

8. The mounting apparatus of claim 3, wherein the operating assembly further comprises a fragment fitting about the screw and attached between the cover and the bezel.

* * * * *